US010296211B2

(12) United States Patent
Chen (10) Patent No.: US 10,296,211 B2
(45) Date of Patent: May 21, 2019

(54) FOLDABLE ELECTRONIC DEVICE

(71) Applicant: Lenovo (Beijing) Limited, Beijing (CN)

(72) Inventor: Jianyu Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/419,139

(22) Filed: Jan. 30, 2017

(65) Prior Publication Data

US 2017/0220072 A1 Aug. 3, 2017

(30) Foreign Application Priority Data

Jan. 29, 2016 (CN) .......................... 2016 1 0067214

(51) Int. Cl.
*G06F 1/16* (2006.01)
*G06F 3/0488* (2013.01)
*G06F 3/046* (2006.01)

(52) U.S. Cl.
CPC ........ *G06F 3/04883* (2013.01); *G06F 1/1616* (2013.01); *G06F 1/1618* (2013.01); *G06F 1/1641* (2013.01); *G06F 1/1652* (2013.01); *G06F 1/1662* (2013.01); *G06F 3/046* (2013.01)

(58) Field of Classification Search
CPC .... G06F 1/1641; G06F 1/1616; G06F 1/1652; G06F 1/1662
See application file for complete search history.

(56) References Cited

U.S. PATENT DOCUMENTS

| | | | | |
|---|---|---|---|---|
| 6,088,220 A | * | 7/2000 | Katz | G06F 1/1616 341/22 |
| 6,256,017 B1 | * | 7/2001 | Bullister | G06F 1/1616 345/168 |
| 6,587,675 B1 | * | 7/2003 | Riddiford | G06F 1/1616 455/557 |
| 8,498,100 B1 | * | 7/2013 | Whitt, III | G06F 1/1618 361/679.17 |
| 2004/0052044 A1 | * | 3/2004 | Mochizuki | G06F 1/1616 361/679.15 |
| 2005/0248501 A1 | * | 11/2005 | Kim | G06F 1/1616 345/1.1 |
| 2007/0279315 A1 | * | 12/2007 | Laves | G06F 1/1615 345/1.1 |
| 2007/0285341 A1 | * | 12/2007 | Manning | G06F 1/1616 345/1.3 |

(Continued)

*Primary Examiner* — Hoa C Nguyen
*Assistant Examiner* — Keith DePew
(74) *Attorney, Agent, or Firm* — Kunzler Bean & Adamson (57) ABSTRACT

An apparatus for a foldable electronic device and a method of manufacturing the same. In one embodiment, the apparatus includes a foldable display module for an electronic computing device. The foldable display module includes a left display module portion that is foldable relative to a right display module portion. The apparatus further includes a foldable input module for the electronic computing device. The foldable input module includes a left input portion that is foldable relative to a right input portion. The apparatus further includes a connector that pivotally connects the foldable display module to the foldable input module such that the foldable display module is capable of pivotally opening and closing relative to the foldable input module.

18 Claims, 5 Drawing Sheets

(56) References Cited

U.S. PATENT DOCUMENTS

| | | | | |
|---|---|---|---|---|
| 2010/0041439 A1* | 2/2010 | Bullister | ............... | G06F 1/1615 |
| | | | | 455/566 |
| 2012/0038570 A1* | 2/2012 | Delaporte | ............. | G06F 1/1616 |
| | | | | 345/173 |
| 2014/0285992 A1* | 9/2014 | Yang | ................. | G02F 1/133305 |
| | | | | 361/809 |
| 2014/0375530 A1* | 12/2014 | Delaporte | ............. | G06F 1/1616 |
| | | | | 345/1.3 |
| 2015/0234433 A1* | 8/2015 | Huang | .................. | G06F 1/1652 |
| | | | | 361/679.26 |
| 2016/0004366 A1* | 1/2016 | Chen | .................... | G06F 1/1681 |
| | | | | 345/173 |
| 2016/0011628 A1* | 1/2016 | Sato | ...................... | G06F 1/1656 |
| | | | | 361/679.3 |
| 2016/0187933 A1* | 6/2016 | Nelson | .................. | G06F 1/1681 |
| | | | | 361/679.11 |
| 2017/0139441 A1* | 5/2017 | Manning | ............... | G06F 1/1616 |
| 2017/0185289 A1* | 6/2017 | Kim | ...................... | G06F 1/1641 |

* cited by examiner

FOLDABLE ELECTRONIC DEVICE

FIELD

The present application relates to the field of electronic products and manufacturing thereof, and particularly to a folding electronic device.

BACKGROUND

Some electronic devices such as notebook computers can have large screens to enhance the viewing experience. Other electronic devices are smaller in dimensions for carrying convenience. The dimensions of existing notebook computers are dictated by the dimensions of the display screen equipped onto the device.

SUMMARY

Embodiments of an apparatus for a foldable electronic device and a method of manufacturing the same are disclosed. In one embodiment, the apparatus includes a foldable display module for an electronic computing device. The foldable display module includes a left display module portion that is foldable relative to a right display module portion. In the embodiment, the apparatus further includes a foldable input module for the electronic computing device. The foldable input module includes a left input portion that is foldable relative to a right input portion. The apparatus further includes a connector that pivotally connects the foldable display module to the foldable input module such that the foldable display module is capable of pivotally opening and closing relative to the foldable input module.

Another embodiment of the apparatus is disclosed that includes a first body for an electronic device. In the embodiment, the apparatus further includes a second body, that is connected to the first body, and that is capable of moving relative to the first body. In the embodiment, the first body includes a first part and a second part. The second body includes a third part and a fourth part. In the embodiment, an entirety of the first part and third part are capable of moving relative to the second part and the fourth part.

In one embodiment method is disclosed manufacturing a foldable electronic device that includes providing a foldable display module for an electronic device, the foldable display module including a left display module portion that it is foldable relative to a right display module portion. In the embodiment, the method further includes providing a foldable input module of an electronic device, the foldable input module comprising a left input portion that is foldable relative to a right input portion. In the embodiment, the method further includes connecting the foldable display module to the foldable input module using a connector that enables the foldable display module to pivotally open and close relative to the foldable input module.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

References to positional indicators such as left and right may be understood to be merely relative points of reference corresponding to certain illustrations shown in the figures. The terms "left" and/or "right" may be understood to refer to elements that from a viewer's perspective are disposed next to each other without regard to their orientation.

Figure 1:
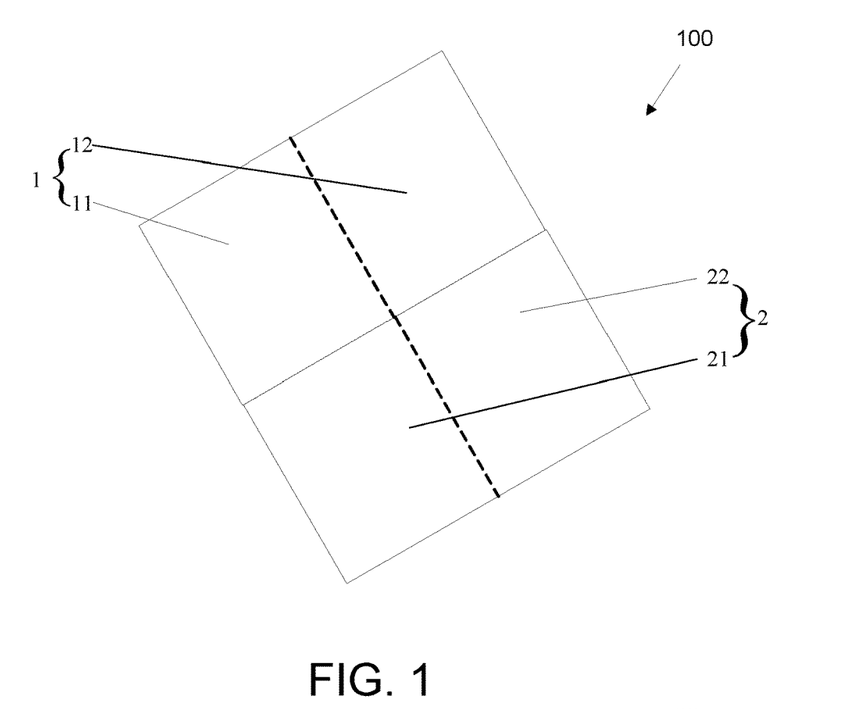
FIG. 1 is a schematic structural diagram illustrating one embodiment of a foldable electronic device in an unfolded disposition.
Figure 2:
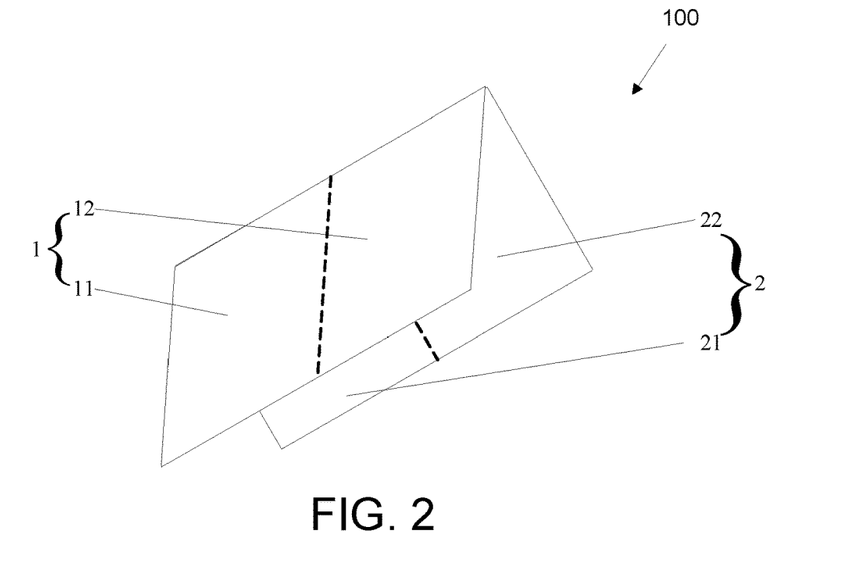
FIG. 2 is a schematic structural diagram illustrating another embodiment of a foldable electronic device held in a partially open position.

FIG. 1 is a schematic structural diagram illustrating one embodiment of an apparatus 100 (e.g. a foldable electronic device) in an unfolded (open) disposition. FIG. 2 is a schematic structural diagram illustrating another embodiment of the apparatus 100 (e.g. a foldable electronic device) held in a partially open position. In some embodiments, the electronic computing device may be a laptop computer, a notebook computer, convertible notebook computer i.e. a 2-in-1 laptop/tablet, a tablet, a phone, and so forth.

In one embodiment, the apparatus 100 includes a foldable display module, e.g. first body 1 for an electronic computing device. The foldable display module 1 includes a left display module portion 11 that folds relative to a right display module portion 12. In the embodiment, the apparatus 100 further includes a foldable input module 2 for the electronic computing device, comprising a left input portion 21 that folds relative to a right input portion 22. In one embodiment, the apparatus 100 further includes a connector 3 (shown in FIGS. 3-6, 8-9) that pivotally connects the foldable display module to the foldable input module such that the foldable display module is capable of pivotally opening and closing relative to the foldable input module.

In one embodiment, the apparatus 100 includes a first body 1 for an electronic device, and a second body 2 for the electronic device, wherein the second body 2 is connected to the first body 1, and the second body 2 can move, e.g. pivotally open and close, relative to the first body 1. In the embodiment, the first body 1 includes a first part 11 and a second part 12, and the second body 2 includes a third part 21 and a fourth part 22.

In the embodiment, the entirety of the first part 11 and third part 21 can move relative to the second part 12 and the fourth part 22. In other words, in an opened position and/or a closed position, the apparatus 100 may be further folded along the dashed line shown in FIGS. 1-2 so as to provide an apparatus 100, e.g. an electronic device, that may be folded up so that the planar area of the folded apparatus 100 is half the planar area of the unfolded apparatus 100.

In some embodiments, the foldable display module 1 and the foldable input module 2 may include some non-foldable internal/external components, such as for example, electronic components such as circuit boards, mechanical parts, cases, frames etc. that do not span the dashed line shown in FIGS. 1-5. In some embodiments, the foldable display module 1 and the foldable input module 2 may include some foldable internal/external components such as, for example flexible circuits, connectors, flexible/elastic cases or frames, and the like.

In some embodiments, the first part 11 and the second part 12 of the first body 1 can be, as a whole, located on the first body 1. In some embodiments, an entirety of the first part and third part can move relative to the second part and the fourth part, in a way that after the first body and the second body move and are fit together e.g. after a display module is fit together with an input module, the first part 11, e.g. the left display module portion, of the first body 1 moves relative to the second part 12, e.g. the right display module portion. At the same time, the third part 21 (e.g. a left input portion) of the second body 2 (e.g. an input module) moves relative to the fourth part 22 (e.g. a right input portion).

Thus, the apparatus 100 e.g. the electronic device, may take up less room when folded than when unfolded, for example when being transported by a user. In some embodiments, the apparatus 100 may provide enhanced interactivity between the user and the apparatus 100 in either a folded or an unfolded disposition, for example by providing certain user interactivity in either the folded or the unfolded disposition.

Figure 3:
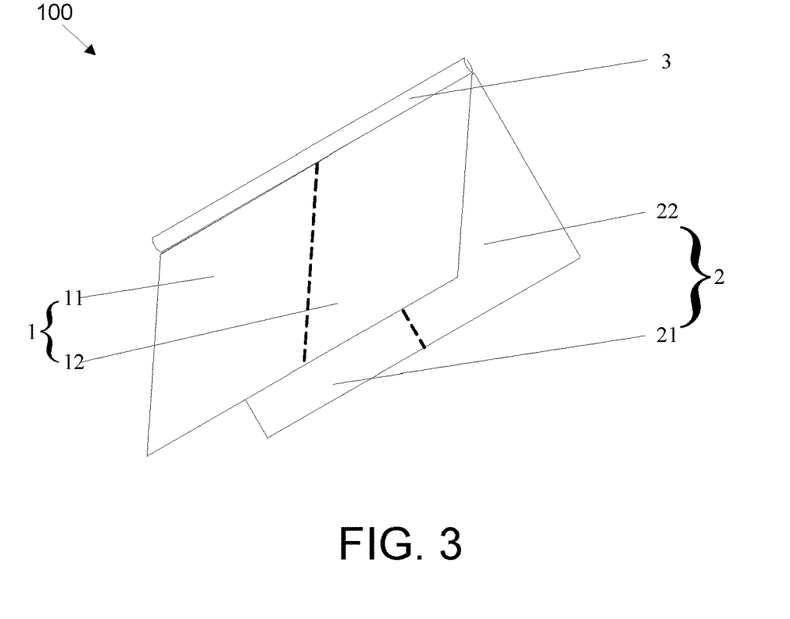
FIG. 3 is a schematic structural diagram illustrating another embodiment of a foldable electronic device held in a partially open position.

FIG. 3 is a schematic structural diagram illustrating another embodiment of an apparatus 100, e.g. a foldable electronic device, held in a partially open position. The apparatus 100 includes a first connecting component 3, e.g. a connector, wherein the first body 1, e.g. a display module, and the second body 2, e.g. an input module, are connected by the first connecting component 3, e.g. a connector. In the embodiment, the second body 2 can rotate, e.g. pivotally open and close, relative to the first body 1, along the first connecting component 3.

In some embodiments, the first connecting component 3 e.g. a connector is capable of holding the first body 1 e.g. a foldable display module at a predetermined angle relative to the second body 2 e.g. a foldable input module. In some embodiments of apparatus 100, the predetermined angle is within a range selected from 0°-10°, 60°-120°, and 160°-180°. In other words, an electronic device such as a laptop can be opened e.g. unfolded in the range 0°-5°, partially opened e.g. in the range 60°-120°, folded e.g. in the range 175°-180°. It may be noted that the apparatus 100 may be folded in either of two directions such that the first component 14, e.g. a flexible display, included in the first body 1, e.g. a display module, faces an input component 24, e.g. a keyboard and/or a touchpad.

In one embodiment, when the first body 1 and the second body 2 are connected by the first connecting component 3, the first body 1 and the second body 2 can be fixedly connected. In other words, in some embodiments, the foldable input module e.g. second body 2 is non-detachably connected to the foldable display module, e.g. first body 1.

In some embodiments, the connector e.g. first connecting component 3 is a detachable connector that is capable of detachably connecting the foldable display module e.g., first body 1 to the foldable input module e.g., second body 2. In some embodiments, the detachable connector e.g. first connecting component 3 is capable of magnetically connecting the foldable input module to the foldable display module.

In some embodiments, the first body 1 and a first rotational axis of the first connecting component 3 may be rotatably connected. The second body 2 and a second rotational axis of the first connecting component 3 can be rotatably connected. In some embodiments, the first rotational axis and the second rotational axis may be connected together.

The first body 1 and the second body 2 may respectively rotate under the drive of the first rotational axis and the second rotational axis, and when the first body 1 rotates, relative to the second body 2, along the first connecting component 3, the first body 1 and the second body 2 may be fit together completely e.g. the display module and the input module may be closed i.e. so that a display included in the display module faces an input such as a keyboard included in the input module. Certainly, an example is given herein to illustrate how the first body and the second body may be connected via the first rotational axis and the second rotational axis. A rotational axis, such as included in a hinged connector, can also be used to connect the first body 1 and the second body 2. Moreover, other types of connectors may be used.

For example, in some embodiments, the first connecting component 3 may be a connector that is bendable at a position between the left input portion and the right input portion. In other words, as a left display module portion and a left input portion of the apparatus 100 is folded against a right display module portion and a right input portion, the bendable connector also folds while remaining operable.

Figure 4:
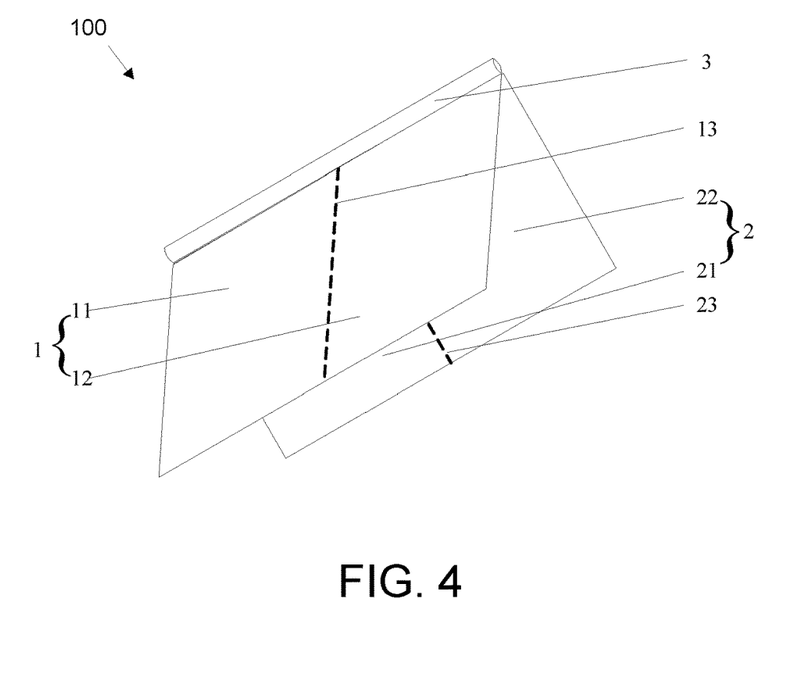
FIG. 4 is a schematic structural diagram illustrating another embodiment of a foldable electronic device held in a partially open position.

FIG. 4 is a schematic structural diagram illustrating another embodiment of a foldable electronic device held in a partially open position. In one embodiment, the first part 11 (e.g. a left display module portion) and the second part 12 (e.g. a right display module portion) intersect at first position 13, and the third part 21 (e.g. a left input portion) and the fourth part 22 (e.g. a right input portion) intersect at a second position 23, wherein the first part 11 rotates (e.g. folds), relative to the second part 12, along the first position 13; the third part 21 rotates (e.g. folds), relative to the fourth part 22, along the second position 23 and the relative positions of the first part 11 and the third part 21 remain unchanged.

In some embodiments, after the first body 1 and the second body 2 rotate and are fit together (e.g. the display module is opened or closed with respect to the input module), the first part 11 folds, relative to the second part 12, along the first position 13 shown by a dashed line. In the embodiments, the third part 21 rotates (e.g. folds), relative to the fourth part 22, along the second position also shown by a dashed line 23. In the embodiments, after the first body 1 and the second body 2 rotate and are fit together (e.g. the display module is opened or closed with respect to the input module), the third part 21 folds, relative to the fourth part 22, along the second position shown by the dashed line 23.

In some embodiments, after the first body 1 and the second body 2 rotate and are fit together (e.g. opened or closed) and the first part 11,21 folds from an unfolded angle e.g. about 0 degrees, relative to the second part 12,22 to a 180 degree angle along the first position, e.g. a folded angle, the first part 11 and the second part 12 are located within the inner side of the folded first body 1. In other words, the first part 11 and the second part 12 may be fit together completely, e.g. folded. Alternatively, after the third part 21 folds, relative to the fourth part 22 from an unfolded angle of about 0 degrees, to a folded 180 degree angle along the second position e.g. as shown by dashed line 23, the third part 21 and the fourth part 22 are located within the inner side such that the third part 21 (e.g. left input portion) and the fourth part 22 (e.g. right input portion) may be fit together completely, e.g. the left input portion may be closed against the right input portion.

In some embodiments, a straight line where the first position 13 is located, a straight line where the second position 23 is located, and a junction of the first body 1 and the second body 2 (e.g. at a position of the connector 3) form a point of intersection. In other words, in some embodiments, a junction at a second position 23 (shown in FIG. 9) of the left input portion and the right input portion comprises an elastic material that enables the left input portion to fold relative to the right input portion.

In some embodiments, the elastic material is selected from leather, rubber, silicone, fabric, and combinations thereof.

In some embodiments, the foldable display module e.g. first body 1 may be disposed in one of a closed position and an opened position relative to the foldable input module e.g. second body 2 and wherein the left display module portion, e.g. first part 11 and the left input portion, e.g. third part 21 are foldable relative to the right display module portion, e.g. second part 12 and the right input portion, e.g. fourth part 22.

In some embodiments, the first position can be a position where a central axis of the first body is located, wherein the same central axis is perpendicular to a straight line where the junction of the first body and the second body is located, and the second position can be a position where a central axis of the second body is located, wherein the same central axis is perpendicular to a straight line where the junction of the first body and the second body is located. In other words, the apparatus 100 may open or close the first body 1 e.g. a display module relative to the second body 2 e.g. an input module.

In the embodiments, when the first body 1 and the second body 2 rotate relatively to a closed state, the entirety of the first part 11 and third part 21 can rotate relative to the second part 12 and the fourth part 22, and the second position 23 is a mapping of the first position 13 on a plane where the second body 2 is located. The closed state refers to a complete fitting of the first body and the second body.

In the embodiments, after the first body 1 and the second body 2 rotate relatively and are fit together, the entirety of the first part can fold relative to the second part; at the same time, the entirety of the third part can fold relative to the fourth part; and the straight line where the first position 13 is located and the straight line where the second position 23 is located are parallel to each other.

Figure 5:
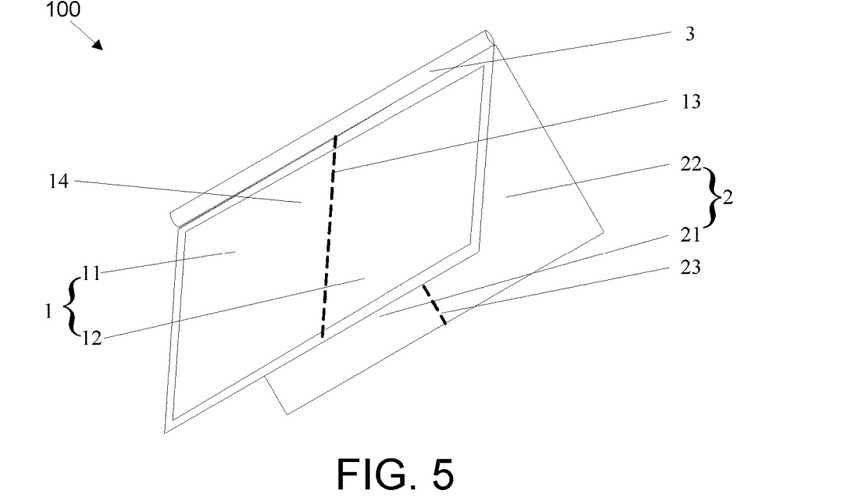
FIG. 5 is a schematic structural diagram illustrating another embodiment of a foldable electronic device.

FIG. 5 is a schematic structural diagram illustrating another embodiment of a foldable electronic device. In some embodiments of the apparatus 100, the first body 1 comprises a first component 14, wherein a part of the first component 14 is located in the first part 11 and another part of the first component 14 is located in the second part 12.

In some embodiments, when the entirety of the first part 11 and third part 21 move relative to the second part 12 and the fourth part 22, the shape and dimensions of the first component remain unchanged and the shape and/or dimensions of the second body 2 change accordingly.

For example, in some embodiments, the first component 14 may be a flexible display, wherein the flexible display is part of the first part 11 and the second part 12 of the first body 1. In some embodiments, after the first body 1 and the second body 2 rotate and are fit together and when the first part 11 folds relative to the second part 12, the folded flexible display, e.g. first component 14, is neither stretched nor compressed, and the shape and dimensions of the flexible display remain unchanged.

When the third part folds relative to the fourth part, the second body will stretch in a direction vertical to the straight line where the folded part is located, and the shape and dimensions of the second body, compared with the shape and dimensions of the second body before folding, change accordingly. Specifically, when the third part folds relative to the fourth part, the length of the junction of the third part and the fourth part is changeable. Preferably, if the flexible display is located on the inner side during folding, the length of the second body at the folding part will be stretched; and if the flexible display is located on the outer side during folding, the length of the second body at the folding part will be compressed.

In other words, the foldable display module is configured so that flexible display is not stretched or compressed. Rather, in some embodiments the foldable display module is folded together so that the left display module portion directly faces the right display module portion in a closed position. In the embodiments, the outside face of the foldable input module will stretch so as to accommodate the folding of the electronic computing device. In this embodiment, the left display module portion and the right display module portion of the foldable display module are folded facing together in the innermost fold and the left input portion is folded facing away from the right input portion The material of the junction of the third part and the fourth part can comprise leather, rubber, silicone, and the like. The junction of the third part and the fourth part can be a position where the third part of the second body folds relative to the fourth part. Certainly, the third part and the fourth part can also be a whole that is elastic and can be stretched or compressed.

The first body 1 can also comprise a frame that wraps around the flexible display, the frame being set and distributed around the flexible display. The frame at a position where the fold is created on the flexible display of the first body 1 can be formed by a soft and bendable material; alternatively, the frame at a position where the fold is created on the flexible display of the first body 1 can be provided with a rotational connecting component 15.

This rotational connecting component can comprise a plurality of first rotational connecting sub-components or a plurality of second rotational connecting sub-components, wherein the first rotational connecting sub-components and the second rotational connecting sub-components can snap together and can be retractably and slidably connected. In this way, when the first body is folded along the position where the first part and the second part are connected, the frame position can fold normally, thereby ensuring that the flexible display is not stretched or compressed during folding.

Figure 6:
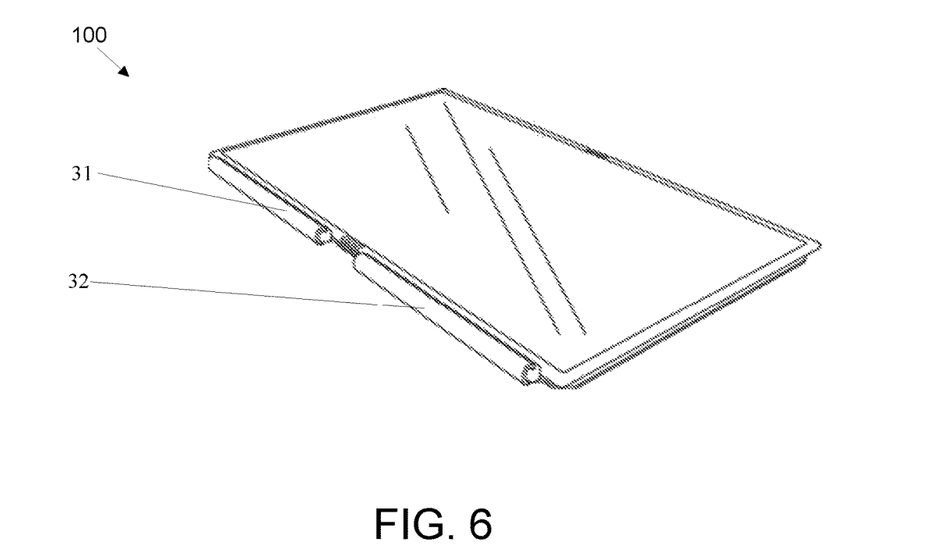
FIG. 6 is a schematic structural diagram illustrating yet another embodiment of a foldable electronic device.

FIG. 6 is a schematic structural diagram illustrating yet another embodiment of a foldable electronic device. In some embodiments of the apparatus 100, the first connecting component 3, e.g. a connector, comprises a first connecting sub-component 31 and a second connecting sub-component 32, wherein the first connecting sub-component 31 and the second connecting sub-component 32 are respectively located on two sides of the point of intersection. In other words, a connector may be a split connector, including ace split connector having first connecting sub-component 31, e.g. a first connector portion spaced at a distance from a second connecting sub-component 32, e.g. a second connector portion.

As illustrated in FIG. 6, in some embodiments, the first connecting sub-component 31 and the second connecting sub-component 32 are not connected together. In some embodiments, the first connecting sub-component 31 may be disposed at the side of the first part 11 of the first body 1, e.g. at the left display module portion. In the embodiments, the second connecting sub-component 32 may be disposed at the side of the second part 12 of the first body 1. Alternatively, the first connecting sub-component 31 may be disposed at the side of the second part 12 of the first body one, and the second connecting sub-component 32 may be disposed at the side of the first part 11 of the first body 1.

In some embodiments, the connector, e.g. first connecting component 3 comprises a first connector portion, e.g., first connecting sub-component 31 that is separable from a second connector portion, e.g., second connecting sub-component 32.

Figure 7:
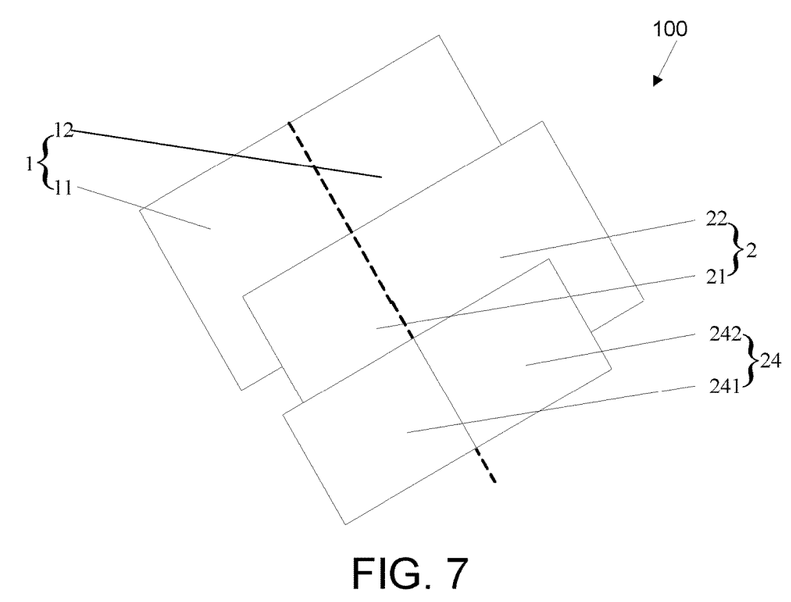
FIG. 7 is a schematic component diagram illustrating another embodiment of a foldable electronic device.

FIG. 7 is a schematic component diagram illustrating another embodiment of a foldable electronic device. In some embodiments, the apparatus 100 may include a second body 2 (e.g. an input module) that includes an input component 24 e.g. a keyboard or another input component such as a touchpad, wherein the input component 24 includes a first input part 241 (e.g. a left input portion) and a second input part 242 (e.g. a right input portion).

In the embodiments, the first input part 241 and the second input part 242 may be respectively positioned at the third part 21 and the fourth part 22 of the second body 2, referred to in FIGS. 1-5.

The first input part 241 and the second input part 242 may be electronically or otherwise connected inside the second body 2, and the first input part 241 and the second input part 242 may perform an input process on the electronic device at the same time.

In some embodiments, the second body 2 may be detachably connected to the first body 1. In other words, the apparatus 100, may further include a detachable connector e.g. first connecting component 3 that is capable of detachably connecting the first body 1 (e.g. a foldable display module) to the second body 2 (e.g. a foldable input module). In some embodiments, the first body 1 and the second body 2 may be connected by a magnet or other means. In other words, the detachable connector e.g. connecting component three may be capable of magnetically connecting the foldable input module e.g. second body 2 to the foldable display module, e.g., first body 1. In other embodiments, other mechanisms besides magnetic connectors may be used to detachably connect the first body 1 to the second body 2.

In some embodiments, the first input part 241 and the second input part 242 may include a keyboard. In the embodiments, the keyboard (e.g. input component 24) may be divided into two parts including a first keyboard portion and a second keyboard portion provided on the second body 2. The first keyboard portion may be disposed at the third part 21, and the second keyboard portion may be disposed at the fourth part 22. In some embodiments, interiors of the first keyboard and the second keyboard e.g. 242 may be connected via cables and the first keyboard e.g. 241 and the second keyboard can be used as a whole for inputting information in to the electronic device.

Figure 8:
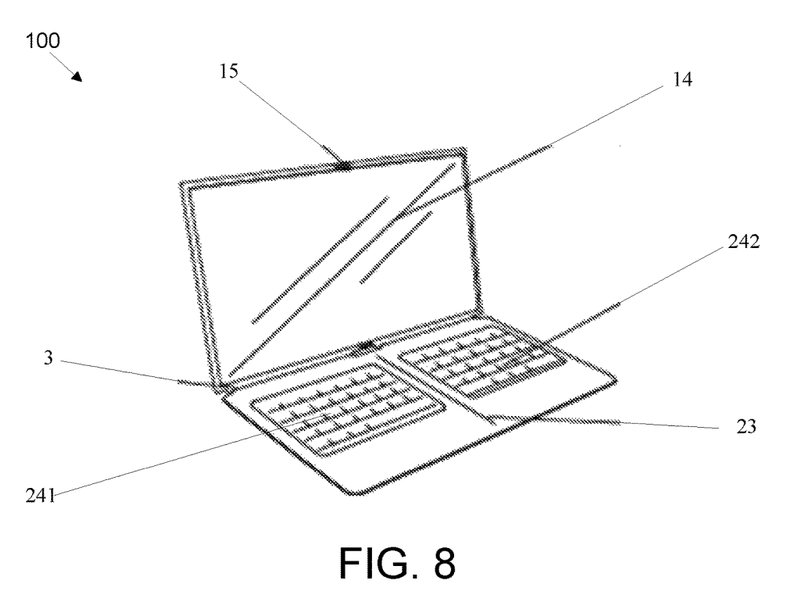
FIG. 8 is a schematic structural diagram illustrating an example embodiment of a foldable electronic device such as a laptop computer.

FIG. 8 is a schematic structural diagram illustrating an example embodiment of a foldable electronic device such as a laptop or notebook computer. In some embodiments, an apparatus 100 is disclosed such as notebook computer. In the embodiments, a side of the notebook computer comprising the display module is the first body 1, and the side comprising that input component 24 (e.g. a keyboard and/or a touch pad) is the second body. In the embodiments, the keyboard 24 may be equally divided into two parts, e.g. a left keyboard and right keyboard. In the embodiments, the left keyboard and the right keyboard are connected in the second body 2, e.g. the input module. In the embodiment, the display of the notebook computer is a first component 14, e.g., a flexible display. In the embodiment, the flexible display is a non-elastic flexible display. In some embodiments, the apparatus 100 may include a foldable frame that some embodiments may be a hard housing such as used in existing laptops. In the embodiments, the foldable frame may fold at rotational connecting component 15 as described above with respect to FIG. 5.

Figure 9:
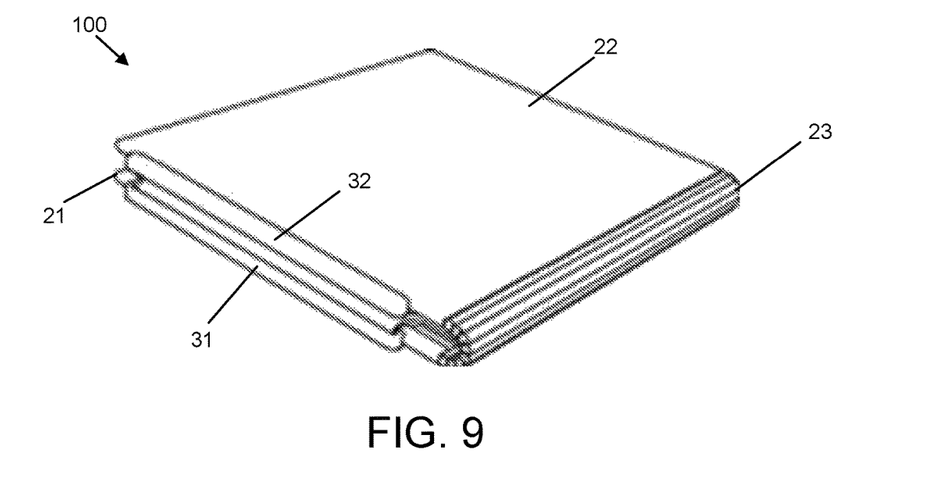
FIG. 9 is a schematic structural diagram illustrating an embodiment of a foldable electronic device with the foldable display module being closed against the foldable input module and a left portion of the electronic device being folded against the right portion of the electronic device.

FIG. 9 is a schematic structural diagram illustrating an embodiment of an apparatus 100 for a foldable electronic device with the foldable display module e.g. first body 1 being folded relative to the foldable input module e.g. second body 2. In the embodiment, a left input portion 21 and a left display module portion 11 (shown in FIGS. 3-4) of the electronic device our folded relative to the right input portion 22 and the left display module portion 12 (shown in FIGS. 3-4) of the electronic device.

In some embodiments, a position where the first body 1 is folded may be a position on the first component 14, e.g. a flexible display (shown in FIG. 8), that extends perpendicularly from a center position of the junction of the first body 1 and the second body 2. In the embodiments, a position where the second body 2 is folded is at a second position 23 where the keyboard 24 is divided. After the side of the display e.g. first body 1 and the side of the keyboard e.g. second body 2 rotate and are fit together, i.e., the notebook computer is closed, as a whole, the apparatus 100 may be further folded along the junction of the first keyboard and the second keyboard so that finally the dimensions of the notebook computer are reduced significantly, forming a structure as shown in FIG. 9, providing portability and space saving for the users.

It should be noted that "fit together" in this embodiment is not limited to the situation where the two parts e.g. 11, 12 and 21, 22 must be completely in contact. In some embodiments, a distance smaller than a threshold value exists between the fitted parts e.g. 11, 12 and 21, 22, or in some embodiments only one edge of the fitted parts e.g. 11, 12 and 21, 22 are in contact.

The electronic device provided by the embodiments disclosed herein may include a first body 1, a second body 2 connected to the first body 1, and capable of moving relative to the first body 1, wherein the first body 1 comprises a first part 11 and a second part 12, and the second body 2 comprises a third part 21 and a fourth part 22. In the embodiments, after the first body 1 and the second body 2 of the electronic device are fit together, the first part 11 of the first body 1 may be folded relative to the second part 12, and the third part 21 of the second body 2 maybe folded relative to the fourth part 22 to achieve the goal of having larger dimensions for the display while maintaining a smaller volume of the electronic device, guaranteeing operational comfort of the user. At the same time, the interactivity between the user and the electronic device is enhanced. In other words, a display module may be folded with a flexible display facing out, e.g. a 2-in-1 configuration or a convertible/tablet configuration.

Figure 10:
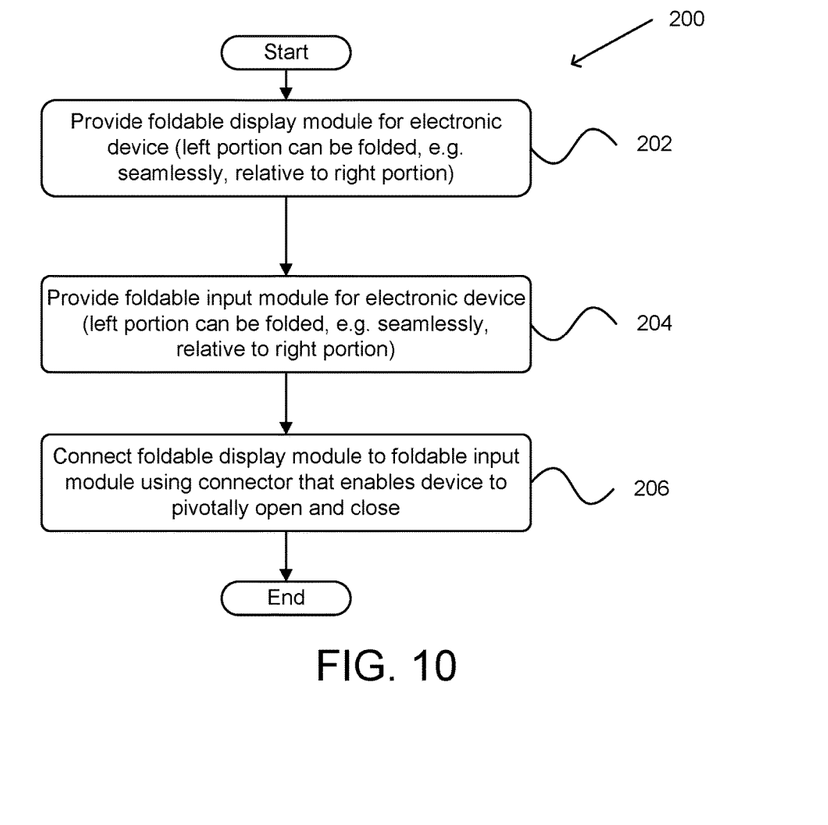
FIG. 10 is a schematic flow diagram illustrating an embodiment of a method for manufacturing a foldable electronic device.

FIG. 10 is a schematic flow diagram illustrating an embodiment of a method 200 for manufacturing a foldable electronic device. In one embodiment, the method 200 includes providing a foldable display module for an electronic device, the foldable display module comprising a left display module portion that is foldable relative to a right display module portion.

In the embodiment, the method 200 further includes providing 204 a foldable input module for the electronic device where the foldable input module includes a left input portion that is foldable relative to a right input portion. The method 200 continues and includes connecting 206 the foldable display module to the foldable input module using a connector that enables the foldable display module to pivotally open and close relative to the foldable input module and the method 200 ends.

In some embodiments, the foldable display module of the method 200 includes a non-elastic flexible display and the foldable input module includes an elastic material such that the left display module portion and the left input portion is foldable folded relative to the right display module portion and the right input portion.

In some embodiments, the connector of the method 200 that connects the foldable display module to the foldable input module is selected from a flexible connector and a split connector.

The various embodiments of the method 200 may be performed using the various components of the apparatus 100 as described above with respect to FIGS. 1-9. Moreover, it may be noted that various embodiments of methods of using the foldable electronic device may be performed consistent with the descriptions embodiments of the apparatus and method described above with respect to FIGS. 1-9.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a display module for an electronic computing device, comprising a left display portion that is foldable along a line of intersection with a right display portion, wherein the display module comprises a flexible display;
    an input module for the electronic computing device, comprising a left input portion that is foldable relative to a right input portion; and
    a connector that pivotally connects the display module to the input module such that the display module is capable of being folded together against the input module,
    wherein, with the display module folded against the input module, the display module and the input module are configured to further fold together along the line of intersection with the left and right display portion positioned between the left and right input portion.

2. The apparatus of claim 1, wherein the connector is capable of holding the display module at a predetermined angle relative to the input module.

3. The apparatus of claim 2, wherein the predetermined angle is within a range selected from 0°-5°, 60°-120°, and 175°-180°.

4. The apparatus of claim 1, wherein the connector is bendable at a position between the left input portion and the right input portion.

5. The apparatus of claim 1, wherein the connector comprises a first connector portion that is separable from a second connector portion.

6. The apparatus of claim 1, wherein the connector comprises a first connector portion spaced at a distance from a second connector portion.

7. The apparatus of claim 1, wherein a junction of the left input portion and the right input portion comprises an elastic material that enables the left input portion to fold relative to the right input portion.

8. The apparatus of claim 7, wherein the elastic material is selected from leather, rubber, silicone, fabric, and combinations thereof.

9. The apparatus of claim 7, wherein the display module may be disposed in one of a closed position and an opened position relative to the input module and wherein the left display module portion and the left input portion are foldable relative to the right display module portion and the right input portion.

10. The apparatus of claim 1, wherein the input module is non-detachably connected to the foldable display module.

11. The apparatus of claim 1, further comprising a detachable connector that is capable of detachably connecting the display module to the input module.

12. The apparatus of claim 11, wherein the detachable connector is capable of magnetically connecting the input module to the display module.

13. An apparatus, comprising:
a first body for an electronic device; and
a second body, that is connected to the first body, and that is capable of moving relative to the first body,
wherein the first body comprises a first part and a second part; the second body comprises a third part and a fourth part; and an entirety of the first part and third part are capable of moving relative to the second part and the fourth part,
wherein, with the first body folded against the second body, the first body and the second body are configured to further fold together along a line of intersection with the first part and the second part positioned between the third part and fourth part, and wherein the first body comprises a flexible display.

14. The apparatus of claim 13, wherein the first body and the second body are connected via a first connecting component, wherein
the second body can rotate, relative to the first body, along the first connecting component.

15. The apparatus of claim 13, wherein the first part of the first body and the second part of the first body intersect at a first position and the third part of the second body and the fourth part of the second body intersect at a second position, wherein:
the first part is foldable relative to the second part, along the first position; the third part is foldable relative to the fourth part, along the second position; and
the relative positions of the first part and the third part remain unchanged.

16. The apparatus of claim 13, wherein the first body comprises a flexible display, wherein:
a part of the flexible display is located in the first part and another part of the flexible display is located in the second part; and
when the entirety of the first part and third part moves relative to the second part and the fourth part, dimensions of the flexible display remain unchanged, and the dimensions of the second body change accordingly.

17. A method comprising:
providing a display module for an electronic device, the foldable display module comprising a left display portion that is foldable along a line of intersection with a right display portion;
providing an input module of an electronic device, the input module comprising a left input portion that is foldable relative to a right input portion; and
connecting the foldable display module to the foldable input module using a connector that enables the foldable display module to pivotally open and close relative to the foldable input module,
wherein, with the display module folded against the input module, the display module and the input module are configured to further fold together along the line of intersection with the left and right display portion positioned between the left and right input portion,
wherein the display module comprises a non-elastic flexible display and the input module comprises an elastic material such that the left display module portion and the left input portion is folded relative to the right display module portion and the right input portion.

18. The method of claim 17, wherein the connector that connects the display module to the input module is selected from a flexible connector and a split connector.

* * * * *